March 3, 1970  J. J. GEISZLER  3,498,312

RESPIRATORY GAS REGULATOR

Filed Oct. 18, 1967

INVENTOR.
JOHN J. GEISZLER
BY
ATTORNEY

United States Patent Office 3,498,312
Patented Mar. 3, 1970

3,498,312
RESPIRATORY GAS REGULATOR
John J. Geiszler, Costa Mesa, Calif., assignor to U.S. Divers Company, Inc., Santa Ana, Calif., a corporation of California
Filed Oct. 18, 1967, Ser. No. 676,320
Int. Cl. B63c 11/18; G05d 7/01; F16k 31/12
U.S. Cl. 137—102                    3 Claims

ABSTRACT OF THE DISCLOSURE

An underwater respiratory gas regulator is described in which a respiratory gas chamber having a pressure sensitive diaphragm as one of its walls, is provided with a pair of valves, both pressure balanced and both actuated by the diaphragm, one valve admitting gas to and the other releasing gas from, the respiratory gas chamber.

---

This invention relates to respiratory systems for use underwater and, while not limited thereto, is particularly and specially applicable to underwater respiratory systems of the type in which the respiratory gas is recovered after exhalation and processed for reuse.

So that the partial pressure of oxygen supplied to divers will not exceed safe values, another gas is mixed with oxygen in increasing proportion as diving depth is increased. For a number of reasons helium is used but helium is expensive. Accordingly, in the case of prolonged diving activity at great depth it is feasible to provide a closed breathing system in which gas is supplied to the diver under pressure and is recovered by return lines subjected to negative pressure.

While the invention is not limited to such systems it is advantageously employed in them. One object of the invention is to provide a regulator form which takes advantage of the negative pressure system for removal of exhaled gas.

Another object is to provide an underwater breathing regulator which permits relatively effortless breathing at great depth and a related object is to provide an underwater respiratory gas regulator having improved exhalation characteristics.

Another object is to provide a regulator of uncomplicated, reliable, and inexpensive construction.

These and other objects and advantages of the invention will be apparent upon examination of the following specification and the drawings which show the mode now preferred for practicing the invention; it being understood that various modifications may be made in the embodiment shown and that other embodiments are possible without departing from the invention.

Figure 1:
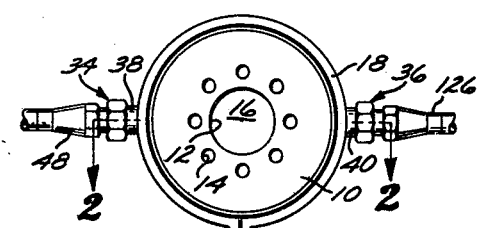
FIGURE 1 is a view in front elevation of an underwater respiratory gas regulator embodying the invention and connected to inlet and outlet conduits shown fragmented.

When viewed from the front as shown in FIGURE 1, the regulator selected for illustration comprises a front cover 10 having a large central aperture 12 surrounded by smaller apertures 14. Water entering these apertures applies pressure on a diaphragm 16 according to the water's depth. The central aperture is made larger to permit manual displacement of diaphragm 16 to produce a result which will be apparent hereinafter. A ring clamp 18 secured by a nut and bolt assembly 20 holds the cover 10 on the regulator body 22.

Figure 3:
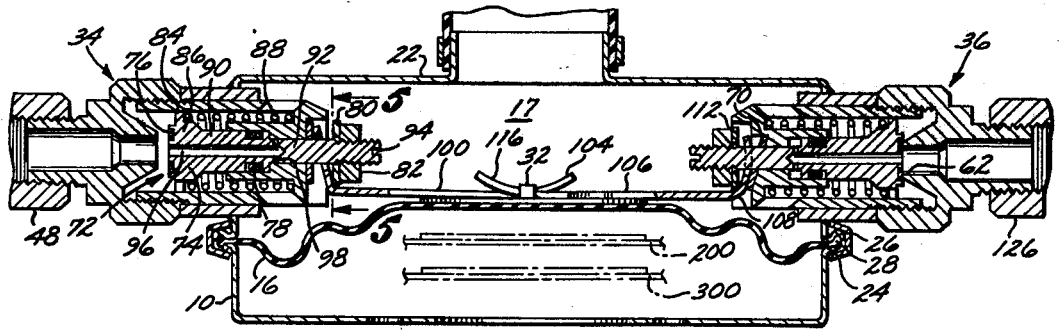
FIGURE 3 is a cross-sectional view of the regulator showing the diaphragm in the position it occupies in an inhalation condition, the normal position and the position occupied in an exhalation condition being indicated by dashed lines.

The cover and the regulator body are both drawn from sheet material into shallow cups having outwardly extending peripheral flanges numbered 24 in the case of the cover and 26 in the case of the body (see FIGURE 3). The cover and body are circular when viewed from the front and they are assembled together with the outer, enlarged margin 28 of the diaphragm 16 between the two flanges 24 and 26. The ring clamp is U-shaped in cross-section and the two flanges 24 and 26 are pressed tightly against the diaphragm margin when the ring is tightened whereby the diaphragm becomes a watertight wall of the regulator body.

The diaphragm 16 is formed from a sheet of elastomeric material with convolutions near its outer margins whereby the central portion of the diaphragm may be displaced readily toward and away from the cover 10 without need to stretch and without developing material elastic bias forces.

Thus assembled the diaphragm 16 and regulator body 22 form a cavity 17 for respiratory gas, the gas pressure of which bears against one side, the rear, of diaphragm 16 in opposition to the water which bears on the front side of the diaphragm. When these pressures are equal, the diaphragm assumes the position shown in dashed lines and number 200 in FIGURE 3. This is a position slightly above the valve closed position it occupies in FIGURE 2. The diaphragm is displaced rearwardly, as shown in FIGURE 3 when the water pressure on diaphragm 16 exceeds respiratory gas pressure in the cavity behind it. When the converse is true the diaphragm is moved to a forward position as indicated in FIGURE 3 by the dashed lines and the numeral 300.

Figure 4:
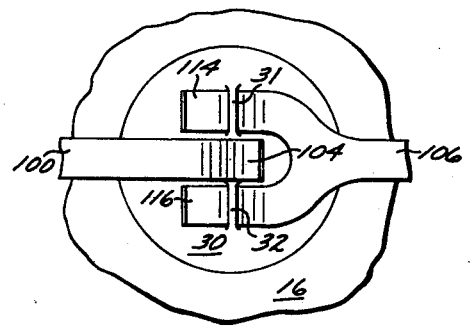
FIGURE 4 is a top plan view showing the inlet and outlet valve actuators and a portion of the diaphragm that actuates them taken on line 4—4 of FIGURE 2.

Means are provided for maintaining the central area of the diaphragm flat and perpendicular to the direction of its displacement. This means comprises, in the embodiment shown, the disk 30 of stiff material which overlies and adheres to the central area of the diaphragm at its rear. The disk 30 bears against valve actuators to be described below and in this connection as best shown in FIGURE 4, it is formed with a pair of straps 31 and 32 which are spaced apart on a common diametric line and are formed by any convenient means as by lancing and extrusion on the rear surface of disk 30 as shown.

At diametric positions on the side walls of the regulator body 22 there are located an inlet valve generally designated 34 and an outlet valve generally designated 36. The body 22 is perforated and sleeves 38 and 40 are inserted in the perforations and welded or otherwise secured in place, advantageously on a common axis which coincides with a diameter of the body as shown.

The two valves 38 and 40 are similar. Both have a two part valve body. Referring to valve 38, one portion 42 of the valve body is cylindrical, open at one end with a reentrant boss at the opposite end. This portion 42 is fitted into sleeve 38 with its open end extending out of the sleeve and exteriorly of the case 22. The exposed end is threadedly engaged with the internal threads at 44 of the other portion 46 of the valve body. This portion has external threads which connect to an inlet line 48. Its internally threaded end toward the regulator body is recessed and a re-entrant boss 50 forms a valve seat encompassing a fluid passageway 52. The interior of the valve housing communicates with the respiratory cavity or chamber 17 by ports 54 in the side walls of the valve body portion 42. The re-entrant bottom 56 of this valve body portion is provided with a bore 58 extending through the body along its central axis. For the first portion of its depth the bore has a diameter slightly larger than the diameter of the inlet 52 at the valve seat formed on boss 50. The remaining length of said bore in re-entrant bottom 56 has reduced diameter such that the cross-sectional area of the larger diameter less that of the smaller diameter is substantially equal to the cross-sectional area of the outlet at the valve head.

Figure 2:
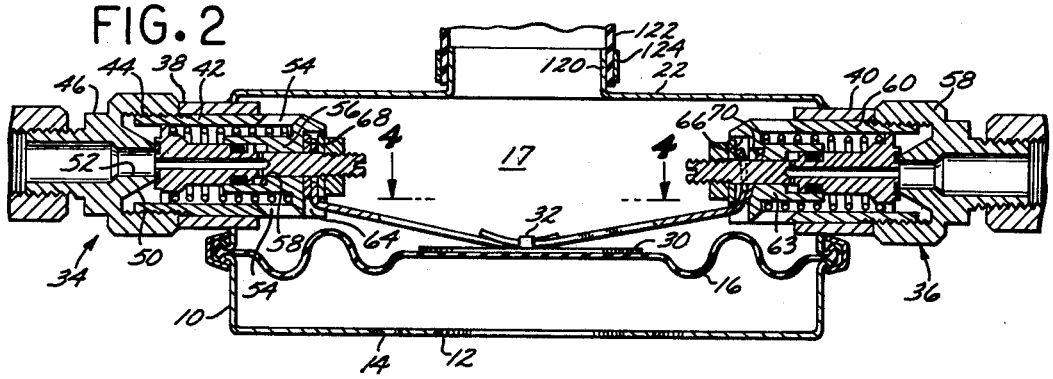
FIGURE 2 is a cross-sectional view of the respiratory gas regulator taken on line 2—2 of FIGURE 1 and showing the diaphragm in position such that both valves are closed.
Figure 5:
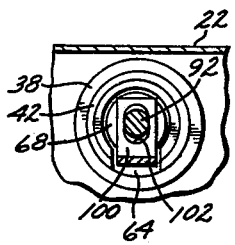
FIGURE 5 is a cross-sectional view of the inlet valve taken on line 5—5 of FIGURE 4.

Thus far described, valve 34 is like valve 36. The latter has a two part body the portions of which are numbered 58 and 60 and correspond respectively to portions 46 and 42 of valve 34. Valve 36 has a seat 62 just like the seat of valve 34 and it has a re-entrant, bored boss 63 at the bottom of body portion like that of valve 34. The only difference in the two valves, in the form selected for illustration in the drawings, occurs at the inner end, the end inside the respiratory cavity 17, of the valve bodies. The inner end of both valve bodies is provided with a shallow bore, the wall being cut away at one side (as best shown in FIGURE 5) to accommodate a valve actuator lever. The recess in body portion 42 of valve 34 is designated by the numeral 64. The recess of valve 36 is designated by the numeral 66. Referring to FIGURE 2, the recess 64 is formed with a flat bottom perpendicular to the axis of the valve but the recess 66 is formed with a stepped bottom that is not perpendicular but which is canted from the perpendicular. In the case of each valve a flat washer, numbered 68 in valve 34 and 70 in valve 36, overlies the bottom of the recess.

In the embodiment selected for illustration the valve head assemblies for the two valves 34 and 36 are alike. Referring to the inlet valve 34 of FIGURE 3, the valve head assembly 72 comprises a head 74, a sealing insert 76, an O-ring seal 78, a washer 80 and an adjustment nut 82. The head is generally cylindrical and elongate. At the left end of assembly 72 in FIGURE 3, the head has an outside diameter at section 84 like the inside diameter of valve body portion 42 part of the wall being cut away to permit the passage of gas past this left end of head 74. To the right of section 84 at the section numbered 86 the head has reduced diameter to accommodate the end coil of a coiled bias spring 88 which encircles the valve head and bears against its section 84 at one end and against the bottom of the recess in the valve body at its other end to bias the valve closed. The next section 90 has reduced diameter to form a sliding fit into the larger diameter portion of the bore in boss 56 of the valve body. The O-ring 78 is lodged in a peripheral recess near the right end of this section 90. The next section 92 has its diameter further reduced to form a sliding fit in the reduced diameter portion of the bore in boss 56. The section 92 extends beyond the valve housing into the cavity and there terminates in a threaded end on which washer 80 and nut 82 are mounted. A kerf 94 in the end of section 92 is provided to hold the valve head against rotation during adjustment of the position of nut 82. A hole 96 is bored from the left end of the valve head 74 along its central axis through head sections 84, 86 and 90 and it continues into section 92 where a cross bore 98 connects the central bore 96 to the exterior of section 92.

The several sections of the valve head 74 have dimensions such that when the head is assembled in the valve body, the cross bore 98 permits gas flow from the valve seat opening through bore 96 and cross bore 98 into the large diameter section of the bore in boss 56 around section 92 and behind section 90 and its O-ring seal 78. The gas in this space has the same pressure as that of the gas at the inlet. Consequently, in view of the area relationship previously described between the area of the valve head exposed to inlet gas pressure and the area behind section 90 exposed to the same pressure, the valve-opening and valve-closing pressure forces are equal and the valve is "balanced." When the valve head is retracted from the seat the cross-bore 98 is carried right, in FIGURES 2 and 3 and as best shown in FIGURE 3, into the region of the reduced diameter portion of the bore in boss 56 to terminate gas pressure counter-force. The valve head assembly of the outlet valve 36 may be and, in the case shown, is identical to the valve head assembly 72 of valve 34.

Each of the valves is provided with an actuating lever which opens its respectively associated valve by forcing the head back away from its seat when the diaphragm 16 is displaced to certain positions. The actuating lever 100 for inlet valve 34 is formed of strip material. One end is bent out of the plane of the remainder of the strip at an angle approaching, but less than, a right angle. This end is provided with an elongated opening 102 by which the actuator is received upon, and may be tipped relative to, the end section 92 of the valve head 74. The lever is assembled on the valve head between washers 68 and 80. The nut 82 is turned up until both washers lie flat against the turned up end of the lever when the valve is closed as shown in FIGURE 2. The other end 104 of the actuating lever 100 is slightly curved upwardly in the region at which it engages the very central area of the stiffener disk 30 of diaphragm 16 when the diaphragm occupies a position at or above the position it has in FIGURE 2. When the diaphragm 16 moves below that position the lever 100 does not follow and valve 34 remains closed.

The actuating lever 106 of valve 36 is also made of strip material. Its inner end 108 is bent upwardly out of the plane of the lever at an angle less than perpendicular and is provided with an elongated opening similar to opening 102 of lever 100 (see FIGURE 5). By this opening the end 108 is assembled on the outer end 110 of the the head of valve 36 between washers 112 and 70. The other end of the lever 106 is bifurcated into two tines 114 and 116. The tines are curved slightly away from the diaphragm 16 whereby they make live contact only with the diaphragm. They are inserted through the straps 31 and 32 of the stiffener 30 of diaphragm 16 so that, unlike lever 100, the lever 106 follows movement of the diaphragm to all its positions.

Lever 106 just begins to crack open the valve 36 at the position it is shown to have in FIGURE 2 and the valve opening is increased as the lever is moved to lower positions (or more forward positions if FIGURE 1 is used as the reference) including the 200 and 300 position of FIGURE 3. End 108 of the lever 106 is curved, as shown, or otherwise shaped so that the lower portion toward the valve housing serves as a fulcrum for a lever system the long arm of which extends from that fulcrum to the line contact with diaphragm 16 and the short arm of which extends from said fulcrum to the other end of the lever at the outer end of section 108. In the position occupied by the diaphragm 16 in FIGURE 3 the lever is held with its short arm out of engagement with washer 112 and the valve remains closed. It remains closed until the diaphragm is lowered to its FIGURE 2 position in which the outer end of section 108 just engages washer 112. When the diaphragm is moved down to its normal position slightly below, position 200 in FIGURE 3, valve 36, like valve 34, is just cracked open. As the diaphragm is moved down more, valve 36 is opened in greater degree.

A conduit connector 120, integrally formed on the rear wall of the casing or body 22, affords communication between a user and the cavity 17 via a hose 122 secured to the conduit connector 120 by a clamp 124.

In operation of the regulator, the diaphragm 16 is effective to sense the depth underwater of the unit in terms of water pressure and to establish a proper pressure condition in cavity 17 for inhalation from and exhalation to the cavity. When the regulator is moved to greater depth and pressure the diaphragm is forced upward as in FIGURE 3 whereupon the inlet valve 34 is opened, the outlet valve remains closed, and gas enters to fill cavity 17, until the cavity pressure equals the water pressure. Conversely, if the regulator is moved to a lesser depth and water pressure the diaphragm will be moved downwardly toward position 300 such that the inlet valve is closed and the outlet is open and until cavity 17 pressure is reduced to the value of the water pressure and the diaphragm is returned to the normal, 200 position.

At any given water pressure, in the absence of exhalation or inhalation, the diaphragm 16 occupies the 200 position and cavity 17 pressure equals water pressure. Upon inhalation to withdraw gas from cavity 17, cavity pressure is decreased whereupon water pressure forces the diaphragm 16 inwardly to open the inlet valve and admit make-up gas until chamber pressure and the diaphragm are returned to normal. Upon exhalation the chamber 17 pressure tends to increase thereby forcing diaphragm 16 outwardly against the water pressure and opening outlet valve 36 to exhaust the excess gas from the chamber through outlet conduit 126. When exhalation ceases the diaphragm will return to normal position as will the outlet valve.

In the preferred form of the invention both inlet and outlet valves are cracked open slightly so that the cavity will be purged continually of exhaled, carbon dioxide laden gas.

While the operation of the regulator has been described primarily in terms of diaphragm position and pressure because they are directly relatable to valve actuation, it can also be described in terms of diaphragm position and cavity 17 volume change. As indicated in FIGURE 3, the movement of the diaphragm is sufficiently great, so that the relative volume change in the cavity is substantial. This means that with each breath a relatively large percentage of fresh gas is available at the user's conduit 120. This large change in volume and also the very simple one cavity arrangement of the regulator are made possible in part by the use of balanced valves, by diametric location of the valves, by the use of the lever actuators arranged so the short arm fulcrums on one of the valve body and valve head and prys on the other, and by the use of the lever arrangement in which one need not maintain continual contact with the diaphragm.

Referring to FIGURES 2 and 3, when the cavity has normal volume the diaphragm occupies the position 200 and both valves are open. When the diaphragm is moved inwardly to a position of reduced volume the inlet valve only is open, and when the diaphragm is moved outwardly to a position of increased volume the outlet valve only is open and the inlet valve lever is disengaged from the diaphragm.

I claim:

1. An underwater respiratory gas regulator for use in a recirculating gas system of the type in which gas is forceably supplied to the regulator under pressure and in which gas is forceably removed from the regulator by vacuum comprising: a gas chamber, communication means by which gas may be inhaled from and exhaled to said chamber, said chamber having one wall displaceable in response to pressure change incident to such inhalation and exhalation to alter the volume of said chamber, an inlet valve and an outlet valve communicating with the interior of said chamber and means for opening said inlet valve as an incident to wall displacement to decrease chamber volume and for opening said outlet valve as an incident to wall displacement to increase chamber volume, said valves being of a pressure balanced type and being cracked open in the undisplaced position of said wall.

2. The invention defined in claim 1 in which said means for opening said inlet valve and for opening said outlet valve comprise a pair of levers one connected to said inlet valve and engageable with said one wall except when chamber volume exceeds a selected value, and the other having connection to said one wall at any chamber volume.

3. An underwater breathing apparatus comprising in combination, a respiratory gas chamber; means by which gas may be inspired from and exhaled into said chamber; and means for maintaining within said chamber a respiratory gas pressure corresponding to the pressure of surrounding water and variable in accordance with inhalation and exhalation pressure variations induced by a user including means comprising an inlet valve for introducing respiratory gas to said chamber, means including an outlet valve for withdrawing gas from said chamber, a diaphragm forming one wall of said chamber having a normal intermediate position and displaceable in one direction by decreased chamber pressure and displaceable in the opposite direction by increased chamber pressure, and actuating means for actuating said valves in response to movement of said diaphragm; said actuating means being effective to maintain both of said valves cracked open in said normal position of said diaphragm and comprising means responsive to displacement of said diaphragm in said one direction for opening said inlet valve and responsive to displacement of said diaphragm in said other direction to open said outlet valve; and in which both of said valves are of the balanced pressure type.

References Cited

UNITED STATES PATENTS

| 2,376,348 | 5/1945 | Fox | 137—102 XR |
| 3,078,846 | 2/1963 | Novelli | 137—102 XR |
| 3,329,159 | 7/1967 | Geiszler | 137—505.12 |
| 3,375,839 | 4/1968 | Crenshaw | 128—142.2 XR |

HAROLD W. WEAKLEY, Primary Examiner

U.S. Cl. X.R.

137—494; 251—282